WILLIAM M. HASELTON INVENTORS
JOHN C. WALSH

ATTORNEY

WILLIAM M. HASELTON
JOHN C. WALSH
INVENTORS

BY *James C. Nemmers*
ATTORNEY

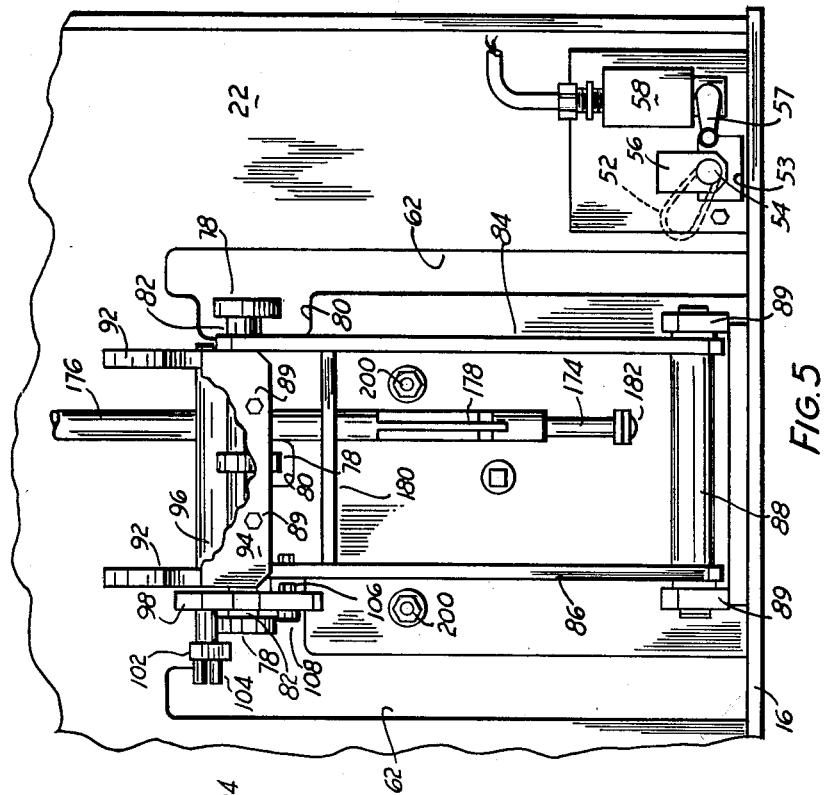
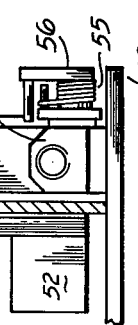
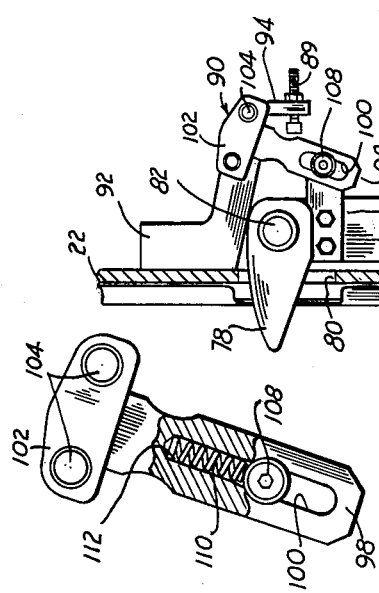

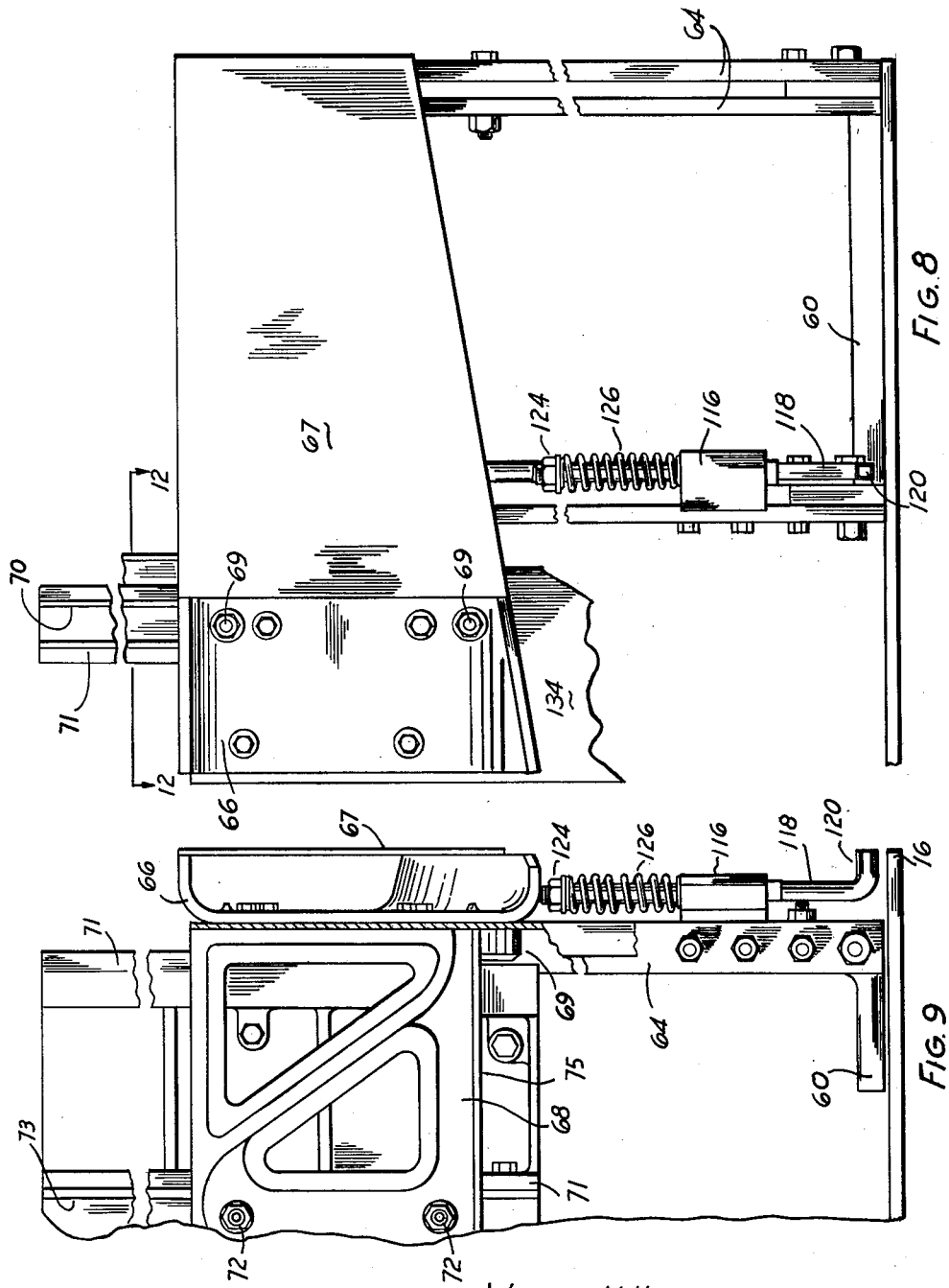

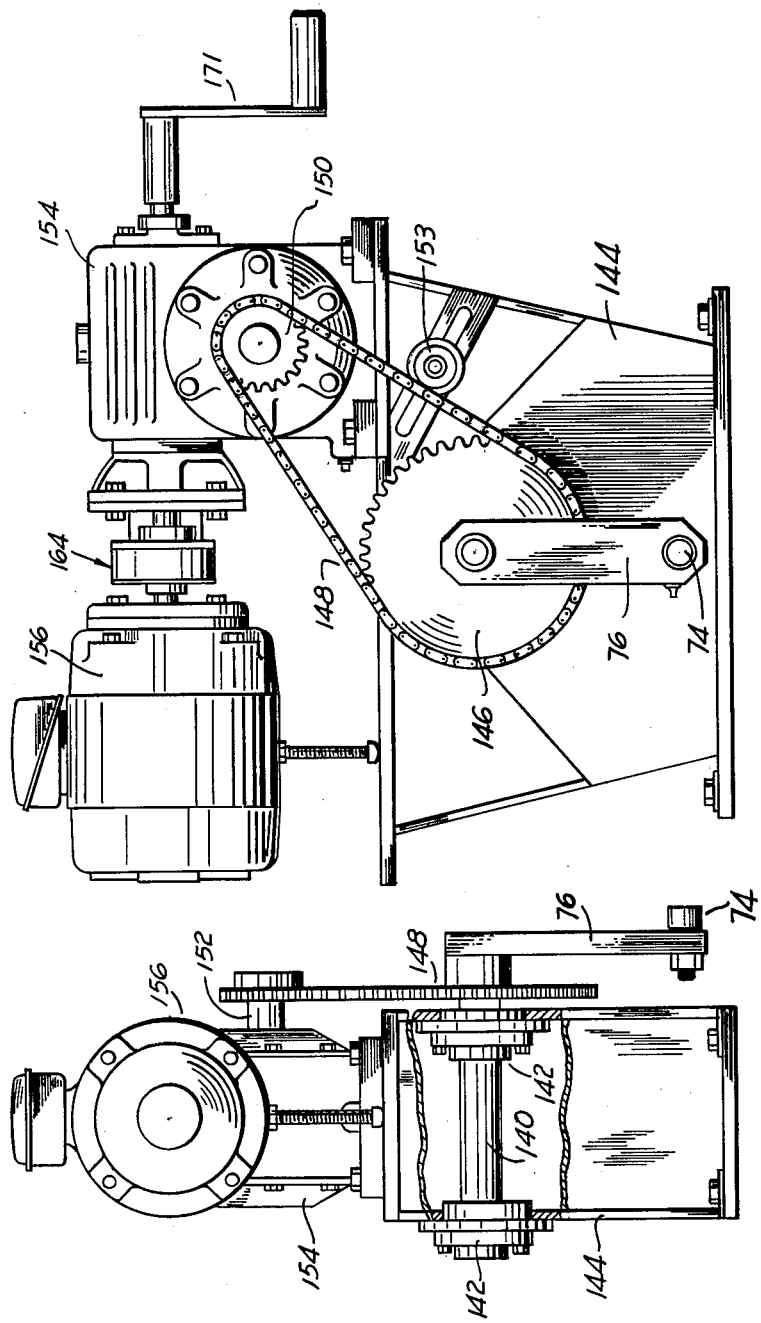

March 24, 1964 W. M. HASELTON ETAL 3,126,104
MACHINE FOR STACKING CASES OR BOXES AND THE LIKE
Filed Nov. 8, 1960 7 Sheets-Sheet 7

WILLIAM M. HASELTON  INVENTORS
JOHN C. WALSH

BY
ATTORNEY

United States Patent Office 3,126,104
Patented Mar. 24, 1964

3,126,104
MACHINE FOR STACKING CASES OR BOXES
AND THE LIKE
William M. Haselton and John C. Walsh, Cedar Rapids,
Iowa, assignors to Cherry-Burrell Corporation, Cedar
Rapids, Iowa, a corporation of Delaware
Filed Nov. 8, 1960, Ser. No. 67,960
10 Claims. (Cl. 214—6)

This invention relates to a machine for handling cases or boxes and the like, and more particularly to a machine adapted for installation in a continuously operating case conveyor line to stack cases prior to storage or shipping.

Many machines of various types have been designed for stacking boxes and cases. Most of these machines are either pneumatically or hydraulically operated and may be broadly classified also as either "bottom up" stackers or "top down" stackers. Some of these prior art machines do a satisfactory job of stacking cases but others, because of their complexity, require a considerable amount of maintenance and usually have a high initial cost. The stackers that are relatively simple in structure and operation are often rough in handling the cases, resulting in shorter case-life and sometimes in damage to the case contents. Other case stacking machines with which we are familiar are difficult to install, requiring a relatively deep pit area and an excessive amount of floor space. This may be important in modern processing plants where space is becoming more and more critical.

It is therefore a principal object of our invention to provide an automatic case stacker that overcomes these shortcomings of prior art stackers. Our novel stacker has several features which make it greatly improved over these presently known.

It is another object of our invention to provide a "bottom up" case stacker that is relatively simple to maintain and one that can be made and sold at relatively low cost. We propose to accomplish this object primarily by making our novel case stacker mechanically operated without the necessity of pneumatic or hydraulic systems or controls.

It is another object of our invention to provide a case stacker that can handle the cases rapidly and gently, thereby lengthening case-life and decreasing the possibility of damage to the case contents. This gentle, efficient handling of the cases is accomplished by a drive assembly that imparts simple, harmonic motion to lifting and lowering of the cases.

It is a further object of our invention to provide a case stacker of a compact construction enabling the stacker to be installed in a minimum of space and with little or no pit area required.

It is a still further object of our invention to provide a stacker that can be easily installed in existing conveyor lines. This object we propose to attain by a stacker design that requires no special drives for the conveyor. Also, since our novel stacker is completely prewired, installation is simplified since it is only necessary to connect an electrical supply to the starter terminals.

It is a still further object of our invention to provide a case stacker that is capable of handling a variety of case sizes without the necessity of making time consuming adjustments for different case lengths or case heights. A simple adjustment for case width is the only one that is required. Also, our novel stacker can be readily adjusted for different stack heights.

It is a still further object of our invention to provide a case stacker that is relatively trouble-free in operation, thereby keeping to a minimum maintenance costs as well as initial cost.

These and other objects of our invention will be readily apparent from a consideration of the following description taken in connection with the accompanying drawings in which:

FIGURE 5 is a side elevation of a portion of the right side of the case stacker showing the case supporting mechanism and elevator actuating pedal;

FIGURE 6 is an end view, partly in section, of the case support assembly and elevator actuating pedal viewing FIGURE 5 from the left;

FIGURE 7 is an enlarged view of a link that forms a part of the platform reset assembly, part of the link being broken away to show interior details;

FIGURE 8 is an elevation view of the elevator assembly, the assembly for the right side of the stacker being shown;

FIGURE 9 is an end view of the elevator assembly viewing FIGURE 7 from the left and showing one-half of the stacker;

FIGURE 10 is an end view of the drive assembly of our novel stacker looking at the drive assembly from the discharge end of the stacker;

FIGURE 11 is a side elevation of the drive assembly of FIGURE 9 looking at the assembly of FIGURE 9 from the left;

Figure 1:
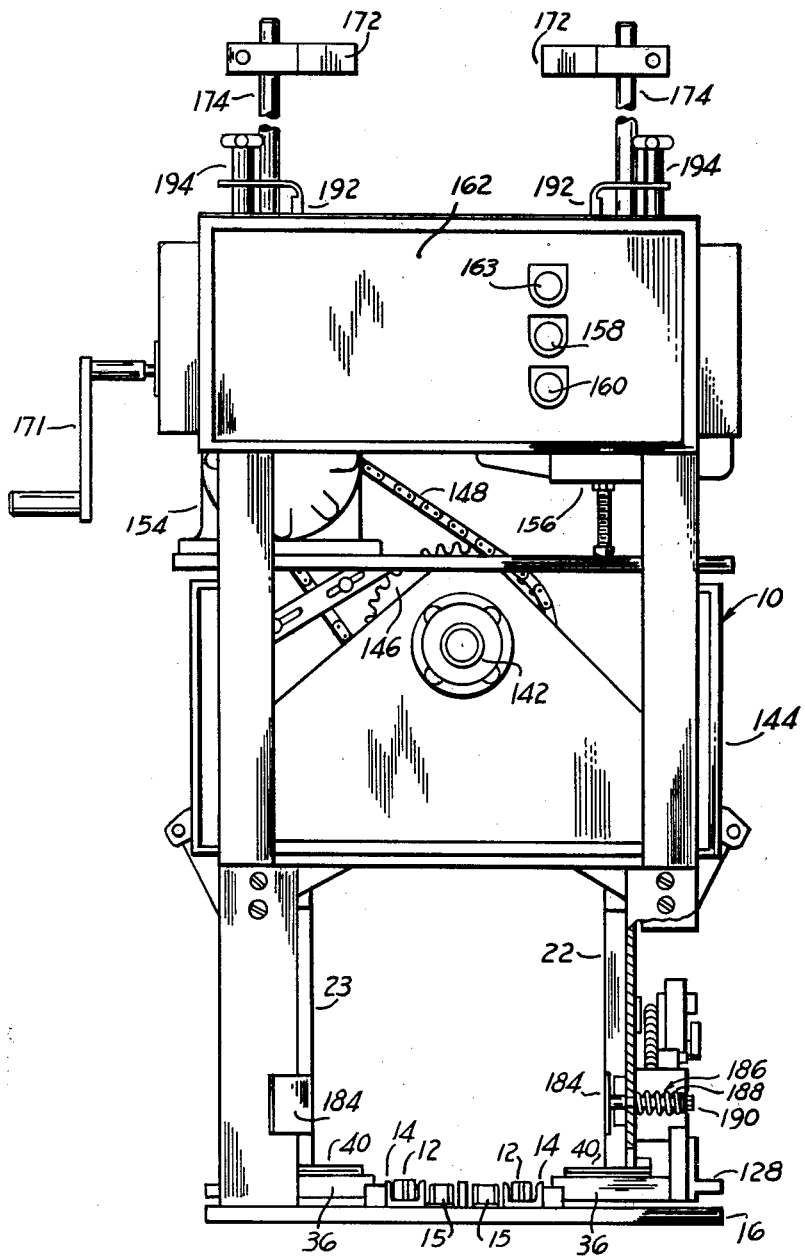
FIGURE 1 is an end view of our novel stacker with the exterior covers removed and looking in the direction of travel of the cases as they pass into and through the stacker.

Referring now to the drawings, our novel case stacker 10 is shown in FIGURE 1 with a continuously operating conveyor 12 running through the machine to carry the individual cases into the discharge the stacked cases from the stacker 10. The conveyor 12 is preferably of the continuous chain-link type and rides in guide channels 14 secured to the platform 16 at the bottom of the stacker 10. However, any suitable conveyor can be used. Conveyor chains 15 are the return lines of conveyor 12.

To help in understanding more clearly the structure and operation of our novel stacker 10, it will be described by setting forth separately the structure and function of each sub-assembly.

*Case Stop Assembly*

Figure 4:
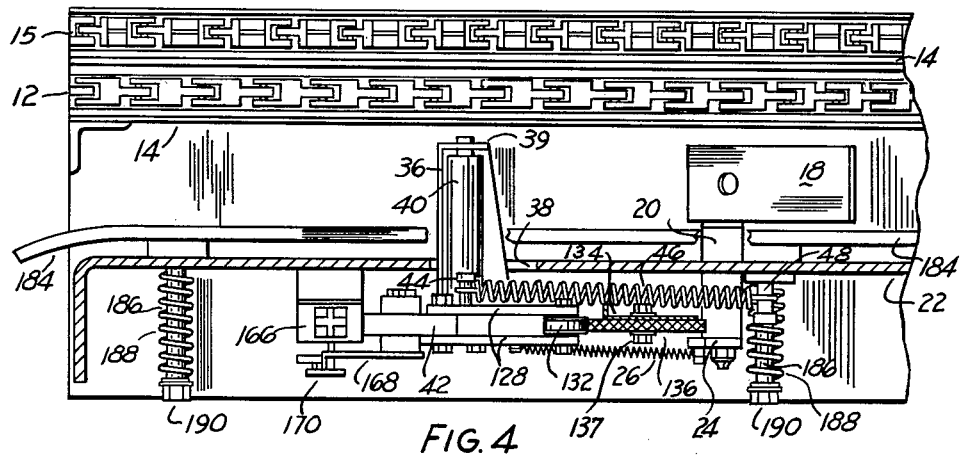
FIGURE 4 is a view partly in section taken on the line 4—4 of FIGURE 3 and showing the case stop assembly from the top.
Figure 3:
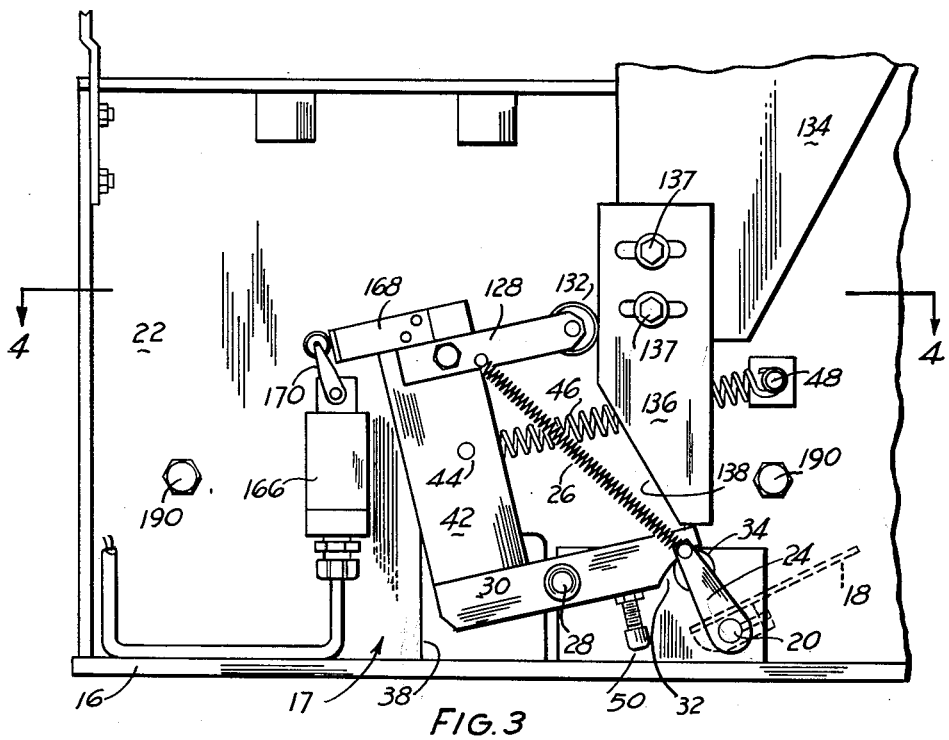
FIGURE 3 is a side elevation of a portion of the right side of the stacker showing in an enlarged view the case stop assembly.

When a case first enters the stacker 10, it enters what we will refer to as the case receiving station. The case receiving station includes the case stop assembly (FIGURES 3 and 4), indicated generally by reference numeral 17, that regulates feeding of the individual cases to what will be referred as the case stacking station at the rear or discharge end of the stacker 10. As a case enters the case stacking station on the chain conveyor 12, the case contacts and depresses two pivotally mounted stop release pedals 18 (FIGURES 3 and 4) one located on each side of the chain guide channels 14. Pedals 18 are mounted for pivotal movement on pins 20 that extend through side panels 22 and 23 on the right and left sides, respectively, of the stacker 10. Since the stacker structure on the right side is practically identical to the left side, only the right side of the stacker 10 will be described in detail for purposes of simplification and any differences between the left and right side structure will be pointed out. A sear 24 is fixed to pin 20 on the outside of side panel 22, and a spring 26 has one end connected to the top of the sear 24. The spring 26 acts through the sear 24 and pin 20 to bias the pedal 18 to a raised position, as shown in FIGURE 3. Pivotally mounted on a second pin 28 outside side panel 22 is a lever 30. The lower edge on one end of lever 30 has a curved cam surface 32 that is engageable with a roller 34 which is mounted near the end of sear 24. Roller 34 is free to turn and when pedal 18 is in its raised position, roller 34 engages the surface 32 and holds up that end of lever 30.

At the end of each lever 30 opposite to the end engaged by sear 24, a case stop arm 36 extends laterally from lever 30 through an opening 38 in the side panel 22. Stop arm 36 extends into the case receiving station to a point adjacent the chain guide channels 14. At that point, the arm 36 is bent at a right angle to provide a mounting 39 for a roller 40. The stop arms 36 on each side of the stacker 10 provide case stops when in a raised position, but with the sears 24 engaged under levers 30 and the arms 36 therefore in a downward position (FIGURE 1), incoming cases on the chain conveyor 12 will ride over the stop arms 36 on rollers 40 and be carried into the case stacking station.

Connected to the same end of lever 30 as the stop arm 36 is an arm 42 extending upwardly perpendicular to the lever 30. Near the middle of arm 42 there is a lug 44 to which one end of a spring 46 is connected. The other end of spring 46 is connected to lug 48 secured to the side panel 22 of the stacker 10. Thus, as a case enters the case receiving station of the stacker 10 and depresses the two stop release pedals 18, pedals 18 pivot the pins 20 which rotate sears 24 thereby disengaging the rollers 34 from the cam surfaces 32 on levers 30. The force of the spring 46 acting on upright arm 40 will rotate the lever 30 clockwise (FIGURE 3) and raise the stop arms 36. An adjustable bumper 50 on the bottom of the lever 30 limits movement of lever 30 when the bumper 50 contacts the stacker platform 16. The bumpers 50 are properly adjusted when the stop arms 36 are about one-half inch above the top of the conveyor chain 12.

Thus, as the first case of a group to be stacked enters the case receiving station and depresses the stop release pedals 18, stop arms 36 will be raised above the conveyor chain 12 preventing all other cases from entering the case stacking station until the stops 36 are again lowered by the case elevator, as described below.

*Elevator Assembly*

As the first case continues through the stacker 10 to the case stacking station, it contacts a second set of pedals 52 (FIGURES 5 and 6) one on each side of the case stacking station. Pedals 52 are pivotally mounted on pins 54 that extend through openings 53 in side panels 22 and 23. However, only pedal 52 on the right side panel 22 actuates the elevator; the pedal 52 mounted on left side panel 23 serves only to prevent the case from possible jamming by becoming turned due to action of the continously operating conveyor 12. In its normal position each pedal 52 is at an angle with the platform 16 with the free end of pedal 52 pointing opposite to the direction of travel of the cases. Each pedal 52 is maintained in normal position by action of a torsion spring 55 wrapped around pin 54. The free end of each pedal 52 preferably is rounded. Thus, when a case contacts the pedal 52 it will cam the pedal to a vertical position, turning pin 54. As the pin 54 mounted on panel 22 turns, a trip arm 56 secured to pin 54 on the outside of panel 22, engages the actuating lever 57 of a limit switch 58 also mounted on the outside of side panel 22. Switch 58 is connected in an electrical circuit with the elevator drive assembly, and as described hereinafter, starts the elevator on a cycle of operation.

The elevator assembly (FIGURES 8 and 9) includes U-shaped elevator frames 60 extending through vertical slots 62 (FIGURE 5) in each of the side panels 22 and 23 of the stacker 10. At its free ends, each frame 60 is connected to a pair of upright members 64 that are in turn connected at their upper ends to a large trapezoidal-shaped plate 66. The upper and lower edges of plate 66 are curved outwardly, and to strengthen plate 66, a reinforcing plate 67 may be welded to these edges.

Figure 12:
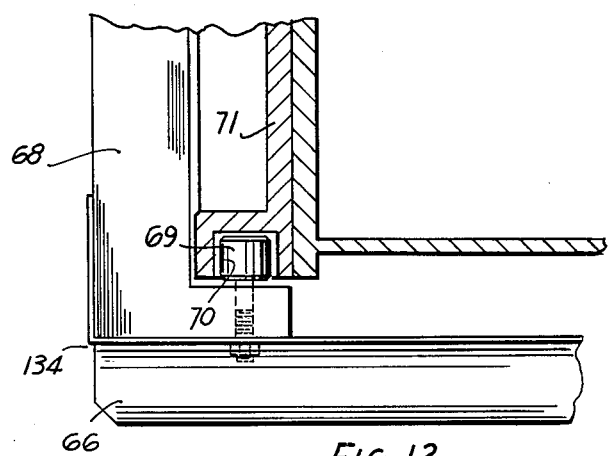
FIGURE 12 is a sectional view taken on the line 11—11 of FIGURE 7 and shows one of the rollers for the elevator assembly.

Secured between the plates 66 and mounted at right angles thereto is a large, rectangular-shaped elevator casting 68 that forms a part of the elevator lifting mechanism. Elevator casting 68 together with plates 66 are movable up and down on a pair of rollers 69 (FIGURE 12) secured to each plate 66 on each side of the stacker 10. Rollers 69 ride in vertical grooves 70 on each side of the stacker. Grooves 70 are formed in the sides of a large casting 71 that is fixed in a vertical position on the front side of the upper portion of the case stacking station. Another pair of rollers 72 may be mounted at the center of elevator casting 68. These rollers 72 ride in a vertical groove 73 formed in the front side of casting 71.

The bottom surface 75 of the elevator casting 68 preferably is a hardened surface that provides a wearing surface for a roller 74 (FIGURE 11) which is mounted on the end of a rotatable crank 76. Crank 76 and roller 74 are parts of the drive assembly described hereinafter. Briefly, the drive assembly for our novel stacker utilizes the basic principles of what is commonly referred to as a Scotch yoke type of mechanism. With this mechanism, the circular motion of the crank 76 is converted into reciprocating motion of the elevator casting 68, the motion produced being true, simple, harmonic motion. This type of motion which is also the motion of the elevator frames 60, lifts the cases very slowly at the start, accelerates them to top speed, then deaccelerates, setting the cases down gently and easily.

*Case Support Assembly*

Our novel stacker is a "bottom up" type stacker. Therefore, once a case has been raised by the elevator frames 60, some means must be provided to hold the case or cases off the conveyor chain 12 until a stack of the desired number of cases is ready to be discharged from the stacking station. To accomplish this purpose, we have provided on each side of the case stacking station three case supports 78 (FIGURES 5 and 6) that form a supporting platform for the cases as they are stacked. The supports 78 extend inward through openings 80 in each of the side panels 22 and 23. When they are in case supporting position, the distance between the supports 78 on each side is less than the width of a case to be stacked.

In order that the elevator frames 60 can move freely even though the case supports 78 are in supporting position, it is of course necessary that the supports 78 be located between the vertical slots 62 in which the elevator frames 60 ride. Supports 78 have a tapered lower surface and a substantially flat top surface and are on each side of the stacker 10 fixed to a horizontal bar 82 that is supported on the outside of side panel 22 or 23 by two vertical supports 84 and 86. The lower ends of supports 84 and 86 are pivotally mounted on a bar 88 turnable in bearings 89 that are secured to the platform 16. Thus, as a case is raised by the elevator frames 60, the top of the case will strike the tapered undersurface of the case supports 78 and cam them out of the way through the openings 80, vertical supports 84 and 86 being pivoted outward on bar 88. Adjustable platform stops 89 may be provided to limit outward movement of supports 78.

Platform and Case Stop Reset Assemblies

After the case has been raised by the elevator frames 60 high enough so that the bottom of the case is above the case supports 78, the supports 78 must be placed back in position beneath the case to hold it up when the elevator frames 60 descend. In order to reset the supports 78 in position under the raised case, we provide a platform reset assembly indicated generally by the reference numeral 90. The reset assembly 90 consists of a pair of spaced-apart brackets 92 extending outwardly from each of the side panels 22 and 23. Brackets 92 are located between the pairs of upright members 64 and are strengthened by a cross-member 94 that also serves as a mounting for the platform stops 89. Carried near the outer ends of brackets 92 is a horizontal rod 96 that is turnable in holes (not shown) in the brackets 92. At the outer end of the rod 96 nearest the upright 86 there is secured a depending link 98 having an elongated slot 100 in its lower end. Adjacent link 98 and at the extreme end of rod 96 there is secured to and turnable with the rod 96 a member 102 having two projecting lugs 104. Secured at a right angle to the upright support 86 is a bracket 106 having a pin 108 extending from its outermost end. This pin 108 rides in the elongated slot 100 of the link 98. A small coil spring 110 (FIGURE 7) is provided in an opening 112 formed longitudinally inside the link just above the slot 100. This spring 110 exerts sufficient horizontal force on upright member 86 through pin 108 and bracket 106 to prevent the case supports 78 from accidentally moving outward out of supporting position, or when the supports 78 are out of supporting position, spring 110 acts to hold them out.

Secured to one pair of upright members 64 that form part of the elevator assembly (FIGURES 8 and 9) is an outwardly extending arm 116 that has a vertically disposed pin 118 slidable in an opening (not shown) in arm 116. Pin 118 has threaded on its upper end 122 a nut 124 and wound around the pin 118 between nut 124 and the arm 116 is a coil spring 126. The bottom end of pin 118 is bent outward and at a right angle to form a hooked end 120.

Thus, as the elevator frames 60 carrying a case thereon ascend, the top of the case will strike and cam out the case supports 78, and the case will continue to rise until the bottom of the case is just above the top of the supports 78. At this point, the hooked end 120 of pin 118, which is also being carried up by the elevator frames 60, will engage one of the lugs 104 in the platform reset assembly 90 and rotate member 102, thereby causing link 98 to exert force on the pin 108 and through bracket 106 push the upright member 86 and the platform supports 78 back into position underneath the case. At this time, the elevator frames 60 have reached the peak of their ascent and will start downward depositing the case on the supports 78.

When the elevator frames 60 have completed their downward movement they are in position to receive another case. In order to allow another case to be carried into the case stacking station by the chain conveyor 12, the stop arms 36 (FIGURES 3 and 4) must be lowered. To lower arms 36 we mount on each upright 42 (of the case stop assembly) two spaced-apart parallel members 128 that support between them at their outer ends roller 132. Secured between the trapezoidal-shaped plate 66 and one end of elevator casting 68 is a depending plate 134. An adjustable cam 136 is secured by bolts 137 to the lower end of plate 134 and has a cam surface 138 engageable with the roller 132. Thus, after the elevator frames 60 have deposited a case on the case supports 78 and the frames 60 continue their descent, the cam surface 138 engages the roller 132 forcing the arm 42 and lever 30 to pivot counter-clockwise (FIGURE 3) about the pin 28, thereby raising the sear-engaging end of the lever 30. The force of spring 26 will then pull the roller 34 on sear 24 back into position under the curved portion 32 of lever 30 holding the case stops 36 in a downward position below the conveyor chain 12. This permits another case to enter the case stacking station to start another stacking cycle.

Drive Assembly

Figure 2:
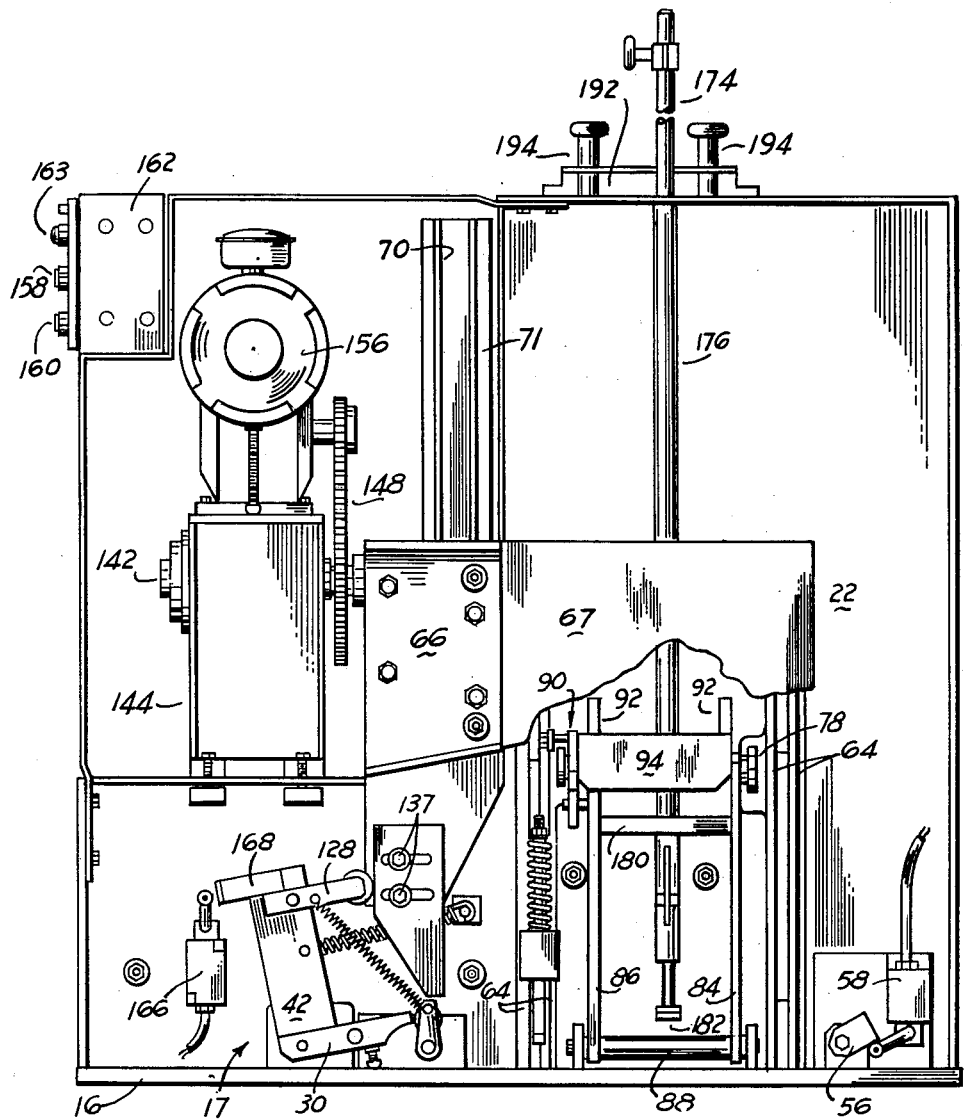
FIGURE 2 is a side view of our stacker viewing the machine from the right side of FIGURE 1, this side being hereafter referred to as the "right" side.

The means for raising and lowering the elevator frames 60 is the drive assembly (FIGURES 10 and 11), of which the crank 76 and roller 74 form a part. Crank 76 is driven by a shaft 140 that rotates in bearings 142 which are mounted on a frame assembly 144 at the front or entrance end of the stacker just above the case receiving station (FIGURE 1). A sprocket 146 and the crank 76 are secured to the shaft 140 in such a manner that they will rotate together as a unit. The sprocket 146 is driven through a chain 148 by a second but smaller sprocket 150 that is mounted on shaft 152 of gear reducer 154. The proper chain tension is maintained by an idler 153. Shaft 152 is driven through reducer 154 by an electric motor 156. The gear reducer 154 serves the function of converting the high speed of the electric motor 156 into sufficient power to lift the elevator assembly. The motor 156 is controlled by stop and start buttons 158 and 160, respectively, mounted on a control panel 162 (FIGURES 1 and 2) in front of the drive assembly. An indicator light 163 may also be provided. We prefer that the motor 156 run continuously during operation of the stacker 10 and to drive the elevator assembly intermittently, we provide an electric clutch 164. The electric clutch 164 is connected in circuit with a relay (not shown) and with the limit switch 58 and becomes engaged when the limit switch 58 is tripped by the trip arm 56 connected to the elevator actuating pedal 52. The relay maintains the circuit after the trip arm 56 has been disengaged. With the clutch 164 engaged, power is supplied through the gear reducer 154 and sprockets 144 and 150 to the crank 76, which is driven at a constant speed.

When the crank 76 is in the position shown in FIGURES 10 and 11, the elevator frames 60 will be at their lowermost position ready to receive a case from the conveyor 12. As the crank 76 begin its circular motion the elevator assembly will reach maximum velocity when the crank 76 is in a horizontal position. As the crank continues its motion the elevator assembly will reach zero velocity again when the crank 76 is in a vertical position with the roller 74 at its maximum height. At this point, the elevator assembly will also be at the peak of its ascent. The crank 76 will again drive the elevator assembly to its maximum velocity when the crank 76 returns to a horizontal position. The elevator assembly will be at its lowermost position and zero velocity when the crank finally returns to the lower vertical position.

Thus, if the velocity of the elevator was plotted graphically as one ordinate with the vertical position of the elevator as the other ordinate, it would be readily seen that the motion of the elevator is true, simple, harmonic motion. This motion provides the most rapid movement of the elevator while still allowing the cases to be picked up and set down gently at the time the elevator reaches the points of zero velocity.

As stated above, the electric clutch 164 will be engaged when the limit switch 58 is actuated, thus starting the elevator frames 60 on their upward travel. To allow time for a case to be carried onto the elevator frames 60 between cycles, the clutch 164 must be disengaged. For this purpose, we provide a second limit switch 166 (FIGURES 2 and 3) mounted on the right side panel 22 near the upright arm 42. A trip arm 168 extends outward from the top of upright arm 42 such that when the case stop arms 36 are returned to a downward inoperative position and the lever 30 is rotated counter-clockwise (FIGURE 3), the trip arm 168 will strike the trip lever 170 of the limit switch 166 thereby opening the electrical circuit to the clutch 164 and causing it to be disengaged. Thus, the elevator frames 60 are at rest simultaneously with the release of the case stop arms 30 which allow another case to leave the case receiving station and pass into the case stacking station.

In order that the elevator can be operated manually if necessary during an emergency or during maintenance or repairs, we prefer to provide a crank 171 that will drive the sprocket 150 through the gear reducer 154.

*Stack Discharge Mechanism*

When the desired number of cases have been stacked, the stack must be lowered and discharged from the stacker 10. To do this we have provided a simple means which consists of horizontal bars 172 (FIGURE 1) extending across and above the case stacking station. The bars 172 are carried by vertical bars 174 that are slidable in and supported by a sleeve 176 (FIGURES 2 and 5) mounted on each of the side panels 22 and 23. In order that the desired stack height may be varied, we prefer to make the bars 172 so that they can be moved up and down on the vertical bars 174, and when the desired number of cases in a stack has been determined, the bars 172 can be fixed at the proper height. Connected to each of the bars 174 at its lower end and extending outwardly is a plate-like member that we have designated a cam 178. A horizontal bar 180 is secured across the two uprights 84 and 86 which are the pivotally mounted supports for the case supports 78.

The discharge mechanism works as follows. During the rise of the last case to be stacked, that case will cam out the case supports 78 and will engage the bottom of the previous case thereby causing the entire stack to be raised until the elevator frames 60 reach their maximum height. At this time the top case in the stack contacts and raises the bars 172 that carry with them the two vertical bars 174. As the vertical bars 174 are pulled upward by action of the stack of cases against the bars 172, the cam 178 is pulled behind the horizontal bar 180 locking the case supports 78 out, thereby allowing the stack of cases to be lowered to the conveyor 12 when the elevator frames 60 descend. As the stack of cases is lowered, the bottom case in the stack depresses the elevator actuating pedal 52 and turns it to a horizontal position thereby allowing the stack of cases to ride over the pedal and be discharged from the stacker 10 on the conveyor 12. The bars 172 and vertical bars 174 carrying the cams 178 return to their normal position by force of gravity, a stop 182 being provided to limit downward movement of the bars 174. The case supports 78 then may be returned to their normal position during the next stacking cycle by action of the platform reset assembly 90.

*Adjusting Mechanism for Different Case Sizes*

Figure 13:
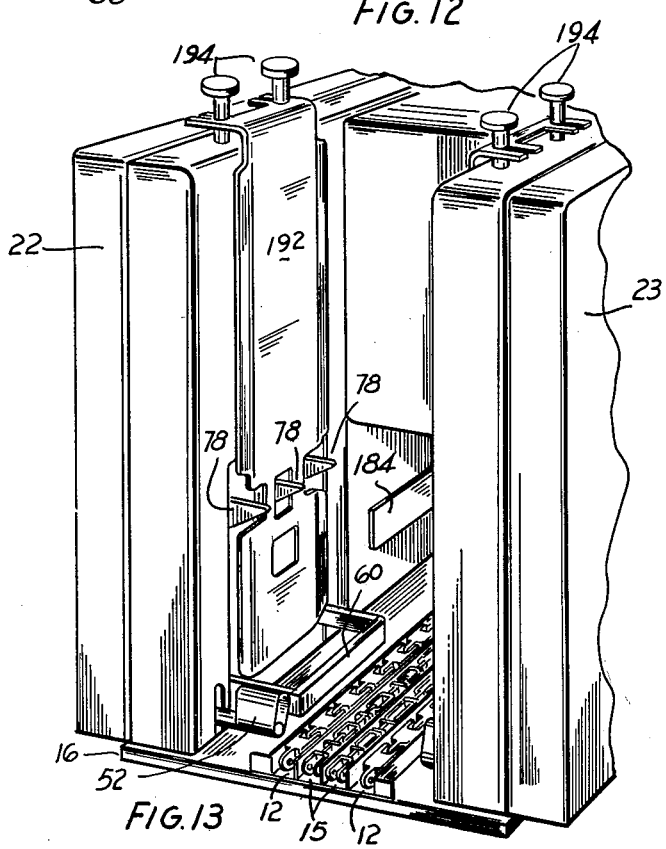
FIGURE 13 is a perspective view of the discharge end of the stacker with the exterior covers in place and showing a portion of the case stacking station.

In order that our novel stacker 10 may accommodate cases of varying widths, we prefer to provide on the inside of each of side panels 22 and 23 in the case receiving station horizontally disposed guide members 184 (FIGURE 1) that are adjustably secured to side panels 22 and 23 by threaded rods 186. The guide members 184 are spring biased inward by the coil springs 188, and by tightening the nuts 190 on rods 186, the position of the guide members 184 may be varied according to the case width. Also, on each side of the case stacking station, we provide adjustable guides 192 (FIGURES 6 and 13). The width of guides 192 is less than the distance between the vertical slots 62 in the side panels 22 and 23. Suitable openings are also provided in guides 192 through which the case supports 78 can project. The guides 192 are each hung on a pair of vertical rods 194 secured on top of the side panel 22 or 23. Adjustment of the distance between the guides 192 for various case widths is made by the threaded rods 196 extending horizontally from the side panels 22 and 23. A spring 198 surrounds each rod 196 and adjustment is made by tightening or loosening a nut 200 threaded on the rod 196.

*Installation and Operation*

The stacker 10 can be installed on the floor without a pit. For example, an existing in-floor case chain conveyor can be utilized since the elevation requirement from the floor to the top of the conveyor chain 12 at the entrance to the stacker 10 is only about two inches. No additional conveyors or drives are necessary. The only electrical wiring necessary is to connect a power source with the control panel 162.

Once properly installed and with the conveyor 12 operating, the cases to be stacked will be carried single file into the stacker 10. To start the stacker motor 156, the start button 160 is depressed. The electric clutch 164 is not engaged at this time, the case stop arms 36 are down, the elevator frames 60 are at the bottom of the stacker 10. As the first case enters the stacker 10, it rides over the rollers 40, by-passing the case stop arms 36, and contacts the stop release pedals 18 depressing them and causing the case stop arms 36 to be swung slightly above the level of the conveyor chain 12 thereby stopping other cases from entering the case stacking station. As the first case continues on into the case stacking station it rides over the elevator frames 60. When directly over frames 60, the case contacts the elevator actuating pedal 52 rotating it to a vertical position thereby tripping the limit switch 58 which closes the circuit to the electric clutch 164. With the clutch 164 engaged, power from the continuously operating motor 156 will be supplied to the crank 76 which will then start revolving. The roller 74 on the end of crank 76 will raise the elevator casting 68 and the elevator frames 60 carrying the case upward. As the case is raised by the elevator frames 60, the top of the case will engage the tapered undersurfaces of the case supports 78 camming them out of position and allowing the case to continue to be carried up by the elevator frames 60. When the crank 76 is at the top of its stroke, the elevator frames 60 will be at the peak of their ascent and therefore will start downward carrying the case with them. However, at the peak of the ascent of the elevator frames 60, the hooked end 120 of the pin 118 engages one of the lugs 104 extending from the member 102 forcing the supports 78 back into position beneath the downwardly traveling case. Therefore, as the elevator frames 60 descend, the case will be deposited on the case supports 78 while the elevator frames 60 continue downward to the bottom of the stacker 10. As the elevator frames 60 reach the bottom of their descent, the cam surface 138 of the cam 136 will engage roller 132 pivoting lever 30 and forcing the case stop arms 36 downward. The case stops will then be locked in their downward position when the roller 34 of sear 24 is pulled beneath the curved portion 32 of lever 30 by action of the spring 26. Also, as the lever 30 is pivoted counter-clockwise (FIGURE 3), the limit switch 166 will be tripped by the trip arm 168 opening the circuit to the electric clutch 164 thereby disengaging it. The elevator frames 60 will therefore remain in their lowest position and with the case stop arms 36 now in a downward position, another case will be carried by the conveyor 12 toward the case stacking station. This second case will depress the stop release pedals 18 and start another cycle of operation.

When the last case of a stack has been picked up by the elevator frames 60, the frames 60 will, as usual, start raising the case. As the case is carried up on the frames 60, the top surface of the case will cam out the case supports 78 and the top of the case will then engage the bottom of the stack of cases that were being supported on the case supports 78. The frames 60 will then continue upward carrying with them the entire stack of cases until the top case contacts the bars 172 raising them and pulling with them the vertical bars 174. This action pulls the cam 178 at the lower end of each of the vertical bars 174 behind the horizontal bar 180 thereby locking out the case supports 78. With the case supports 78 locked out, the cases will be carried all the way down on the elevator frames 60. When the frames 60 reach the bottom, the lowest case will engage the elevator actuating pedal 52 forcing it to turn counter-clockwise (FIGURE 5) and thereby allow the stack of cases to be carried out of the stacker by the continuously operating conveyor 12. Also, as the elevator frames 60 are lowered, the roller 132 will be engaged by cam 136 to pivot lever 30 and lower the stop arms 36. This allows another case to move into the stacking station and start another stacking cycle.

The bars 172 and vertical bars 174 will return to their normal positions on stops 182 by force of gravity thereby moving the cam 178 from behind the bar 180 and allowing the case supports 78 to be reset by the reset assembly 90 when the next case goes through the stacking cycle.

Having thus described our invention, it will be apparent to those skilled in the art that various modifications and revisions can be made without departing from the spirit and scope of our invention. It is our intention, however, that such revisions and modifications be included within the scope of the following claims.

We claim:

1. In a case stacking apparatus having a case stacking station and a case receiving station with a continuously operating case conveyor running through said stations and an elevator movable up and down in said case stacking station, means in said case receiving station for intermittently stopping cases being carried on the conveyor, said means comprising a case stop movable into and out of the path of a case being carried on said conveyor, means holdnig said stop out of the path of a case, means engageable by a case entering the stacking station to release said holding means and thereby stop additional cases from entering said stacking station, and means carried by said elevator to move said case stop out of the path of a case and to provide for re-engagement of said holding means.

2. In a case stacking apparatus having a case stacking station and a case receiving station with a continuously operating case conveyor running through said stations and an elevator movable up and down in said case stacking station, means in said case receiving station for intermittently stopping cases being carried on said conveyor, said means comprising a lever pivotally mounted between its ends adjacent said conveyor, a case stop connected to one end of the said lever for movement into and out of the path of a case being carried on said conveyor, spring means biasing said case stop to a case stop position in the path of a case, a member engageable with the other end of said lever to hold said case stop out of the path of a case on said conveyor, a releasing means operatively connected to said member and engageable by a case entering the stacking station to move said member out of engagement with said lever and thereby release said stop into a case stop position, a cam follower connected to said lever, and a cam carried by said elevator and engageable with said follower when said elevator reaches its downward position to pivot said lever and move said case stop out of the path of a case on said conveyor.

3. The case stacking apparatus of claim 1 in which there is provided control means for preventing operation of said elevator, and said case stop engages said control means when moved out of the path of a case to cause said elevator to remain in a case receiving position.

4. The case stacking apparatus of claim 2 in which said releasing means is a pedal pivotally mounted between the case receiving station and the stacking station in the path of a case being carried on said conveyor, said pedal being depressed by a case passing from the receiving station to the stacking station thereby to move said member out of engagement with said lever and release said case stops.

5. The case stacking apparatus of claim 2 in which said lever is provided with a trip arm, and there is provided elevator control means to prevent operation of said elevator on a cycle of upward and downward movement, said trip arm being engageable with said control means when said case stop is moved out of the path of a case thereby stopping said elevator in a case receiving position.

6. In a case stacking apparatus having a case stacking station with a case conveyor running therethrough, vertical arms pivotally mounted on opposite sides of said stacking station, case supports secured to said arms and movable to and from a case supporting position when said arms pivot, the distance between said supports when in case supporting position being less than the width of a case to be stacked, a case elevator movable up and down in said stacking station to lift a case fed thereto on said conveyor above said case supports, said supports having sloped bottom surfaces so that the case being lifted by said elevator cams said supports out of case supporting position, a link pivotally mounted at the side of said stacking station near the upper portion of said arms, said link having an elongated slot therein, a pin rigidly affixed to said vertical arms and slidable in said slot, a lug projecting from said link, movement of said lug upwardly or downwardly causing said link to pivot to cam said pin and thereby cause said vertical arms to pivot, and a member connected to said elevator in a position to engage said lug at the peak of ascent of said elevator to move said lug upwardly and thereby return said case supports to a case supporting position after a case has been lifted above the supports by the elevator.

7. The case stacking apparatus of claim 6 in which resilient means is provided in combination with said link and is engageable with said pin to bias said arms carrying the case supports into case supporting position.

8. In a case stacking apparatus having a case stacking station with a case conveyor running therethrough, case supports pivotally mounted on two opposite sides of said stacking station and movable to and from a case supporting position, the distance between said supports when in case supporting position being less than the width of a case to be stacked, a case elevator movable up and down in said stacking station to lift a case fed thereto on said conveyor above said case supports, said supports having sloped bottom surfaces so that the case being lifted by said elevator cams said supports out of case supporting position, first means movable with said elevator to return said case supports to a case supporting position after a case has been lifted above the supports by the elevator, second means movably mounted above said case stacking station and engageable by the uppermost case being carried by said elevator, said second means being positioned at a predetermined height so as to be engageable and moved upwardly when the desired number of cases have been stacked, and a cam member connected to said second means and engageable with said case supports to hold said case supports out of case supporting position when said second means is moved upwardly.

9. The case stacking apparatus of claim 8 in which said second means comprises a vertical rod slidably mounted at the side of said case stacking station, and a member projecting inwardly over said case stacking station at the top of said rod, the cam member being connected to said rod at its lower end and movable into and out of a position between said case supports and the case stacking station, said rod being of a length so that the cam member will be interposed between the case supports and the case stacking station only when said rod has been raised by the proper number of cases in the stack.

10. The case stacking apparatus of claim 9 in which said case supports are pivotally mounted on spaced-apart vertical arms, said vertical arms are connected at their upper ends by a horizontal member from which said case supports extend, and said vertical rod is slidably mounted between said horizontal member and the case stacking station, the cam member at the lower end of said rod being raised by said rod and positioned between said horizontal member and the case stacking station to prevent movement of said case supports into the case stacking station.

References Cited in the file of this patent

UNITED STATES PATENTS

| | | |
|---|---|---|
| 1,292,635 | Parker | Jan. 28, 1919 |
| 1,622,076 | Austin | Mar. 22, 1927 |
| 2,550,587 | Neja | Apr. 24, 1951 |
| 2,687,813 | Verrinder | Aug. 31, 1954 |
| 2,857,040 | Campbell | Oct. 21, 1958 |
| 2,993,315 | Verrinder | July 25, 1961 |
| 3,039,624 | Campbell | June 19, 1962 |

FOREIGN PATENTS

| | | |
|---|---|---|
| 851,024 | Great Britain | Oct. 12, 1960 |